(12) United States Patent
Litwin, Jr. et al.

(10) Patent No.: US 6,834,091 B2
(45) Date of Patent: Dec. 21, 2004

(54) TIME SYNCHRONIZATION FOR DATA OVER A POWERLINE MODEM NETWORK

(75) Inventors: Louis Robert Litwin, Jr., Plainsboro, NJ (US); Kumar Ramaswamy, Plainsboro, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 411 days.

(21) Appl. No.: 09/825,232

(22) Filed: Apr. 3, 2001

(65) Prior Publication Data

US 2002/0141523 A1 Oct. 3, 2002

(51) Int. Cl.[7] .............................. H04L 7/00; H04B 1/38
(52) U.S. Cl. .................. 375/356; 375/222; 340/310.06
(58) Field of Search ................................ 375/219, 222, 375/257, 356; 340/310.01, 310.06; 725/111

(56) References Cited

U.S. PATENT DOCUMENTS 5,987,576 A * 11/1999 Johnson et al. ............. 711/167
6,414,968 B1 * 7/2002 Sutterlin et al. ............ 370/480
6,577,231 B2 * 6/2003 Litwin et al. .......... 340/310.01

FOREIGN PATENT DOCUMENTS

EP          0 998 053 A2 *  3/2000

OTHER PUBLICATIONS

Litwin et al., Pub. No.: US 2003/0018922 A1, Pub. Date: Jan. 23, 2003.*

* cited by examiner

Primary Examiner—Young T. Tse
(74) Attorney, Agent, or Firm—Joseph S. Tripoli; Harvey D. Fried; Joseph J. Kolodka

(57) ABSTRACT

Synchronization of a powerline modem network (10) with a plurality of devices is provided. A plurality of devices (16 and 18) each include a powerline modem (20) and a clock circuit (22) for synchronizing a data rate. The powerline modem permits data transmission between the plurality of devices over a powerline network on data carriers (28). A synchronization signal is transmitted over the powerline network. The synchronization signal includes a carrier (30) operating at a frequency different from the data carriers. The synchronization signal provides each of the plurality of devices a time reference to synchronize the data rate.

8 Claims, 2 Drawing Sheets

TIME SYNCHRONIZATION FOR DATA OVER A POWERLINE MODEM NETWORK

BACKGROUND

1. Technical Field

This disclosure relates to power-line modem networks, and more particularly, to an apparatus and method for providing time synchronization for data in devices of a power-line modem network.

2. Description of the Related Art

Powerline modems communicate by employing a power network as a transmission medium. Powerline modems are employed on a device to set up communication with a master device or controller. Communication carried out on the powerline provides the capability of any plug-in device to communicate on the powerline network. Such devices on the powerline network may share data including digitally compressed video or picture data.

When digitally compressed video data is transmitted over a network, timing synchronization must be maintained between a transmitter of the data and a receiver of the data to display the images at a proper rate. In conventional systems, a timestamp is typically inserted into the data stream. The time stamp provides a reference for the rate in which the images should be displayed to achieve the proper display rate. However, the inclusion of the time stamp in the data stream wastes bandwidth which would otherwise be available for the transmission of data.

There is a trade-off between frequency of insertion and bandwidth wasted. Inserting timestamps more often keeps the clocks better synchronized, but higher frequency rates requires more bandwidth.

Therefore, a need exists for data synchronization between a transmission device and a receiver device in a powerline modem network. A further need exists for synchronization between the devices, which provides a larger amount of available bandwidth and permits synchronization of video, even for asynchronous devices.

SUMMARY OF THE INVENTION

A method of synchronization of a powerline modem network for a plurality of devices in accordance with the present invention provides a plurality of devices having a powerline modem and a clock circuit for synchronizing a data rate. The powerline modem permits data transmission between the plurality of devices over a powerline network on data carriers. A synchronization signal is transmitted over the powerline network. The synchronization signal includes a carrier operating at a frequency different from the data carriers and provides each of the plurality of devices a time reference to synchronize the data rate.

A powerline network with data synchronization in accordance with the present invention includes a plurality of devices each having a powerline modem and a clock circuit for synchronizing a data rate. The powerline modem permits data transmission between the plurality of devices over the powerline network on data carriers. A master device has a powerline modem coupled to the powerline network and includes a clock transmission circuit. The clock transmission circuit generates a synchronization signal over the powerline network, and the synchronization signal includes a carrier operating at a frequency different from the data carriers. The synchronization signal provides each of the plurality of devices a time reference to synchronize the data rate.

In other embodiments, transmitting the synchronization signal over a plurality of carriers operating at a frequency different from the data carriers is preferable. The step of transmitting a synchronization signal may include the step of sending a current timestamp to the plurality of devices. Each of the plurality of devices then sounds off during an assigned time slot, and an error offset is determined between the assigned time slot and the sounding off of the device. A correction factor is transmitted to the plurality of devices to correct synchronization of the clock circuit of the devices, which may include error offsets.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention synchronizes devices by employing one or more subcarrier frequencies, which provide a synchronization signal to all devices in a powerline modem network. A powerline modem network includes a plurality of powerline modem devices. Devices, which are serviced by the powerline modems, may include devices capable of displaying and playing video images. The present invention provides synchronization for such devices to ensure a proper display rate. By employing additional subcarriers, synchronization signals may be distributed over the network without reducing bandwidth of data subcarriers. Advantageously, the synchronization signals permit different devices with different standards (e.g., frequencies of operation) to derive timing references from the same synchronization subcarrier.

Powerline modems communicate by employing a power network as a transmission medium. Powerline modems are employed on a device to set up communication with a master device or controller. Communication carried out on the powerline provides the capability of plug-in devices to communicate on the powerline network. Powerline devices may include devices capable of displaying video. The present invention describes a way to provide a time synchronization for devices transmitting digitally compressed video or other type of data that needs a time reference (e.g. MPEG data for video) over a powerline modem network. In one embodiment, when digitally compressed video is transmitted over a powerline network, timing synchronization is maintained between a transmitter and a receiver in accordance with timing information communicated over a subcarrier frequency to display the images at the proper rate.

Figure 1:
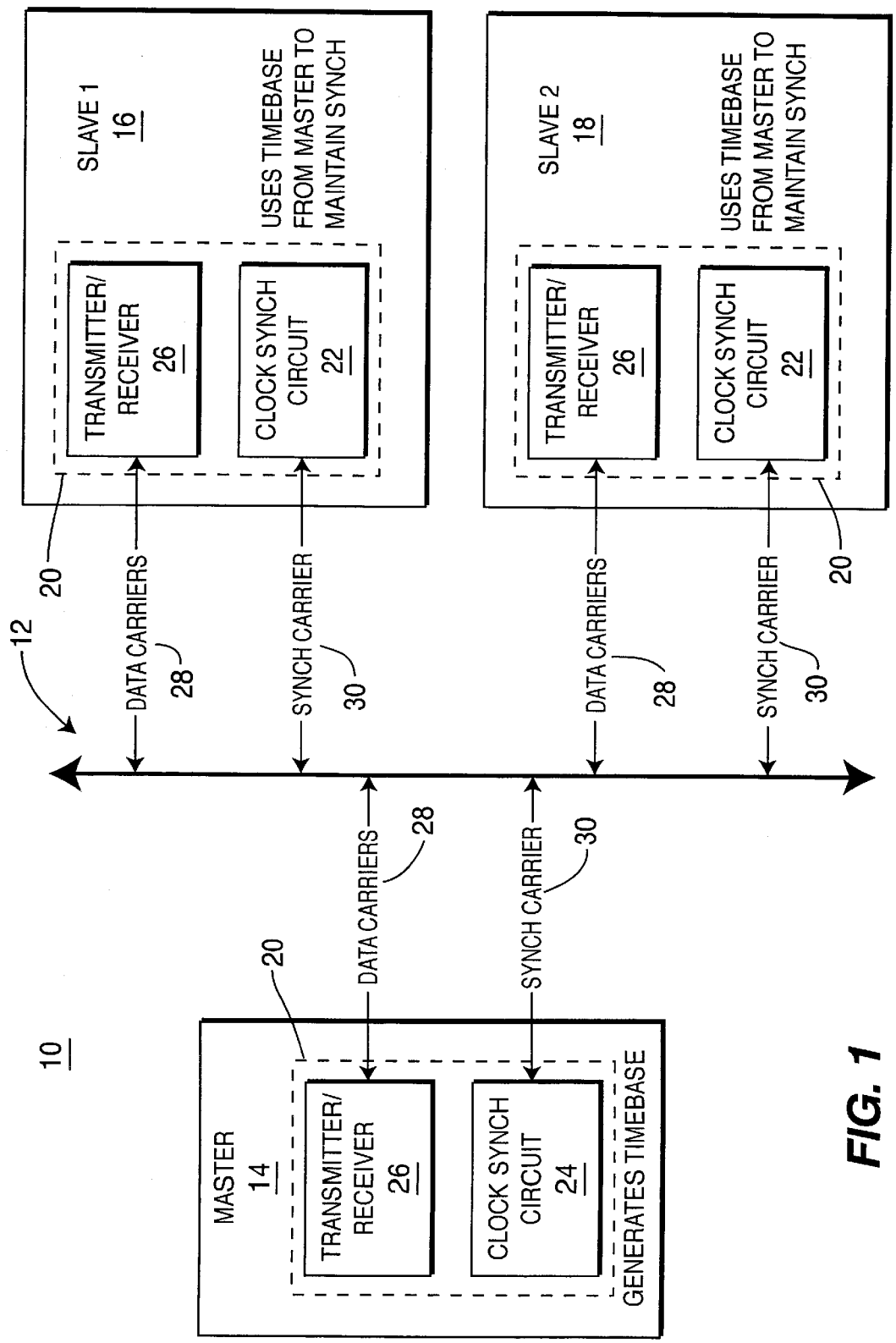
FIG. 1 is a block/flow diagram showing a system/method for synchronizing a powerline network in accordance with the present invention.

Referring now in specific detail to the drawings in which like reference numerals identify similar or identical elements throughout the several views, and initially to FIG. 1, a block diagram of an illustrative network 10 is shown in accordance with the present invention. A powerline network 12, which may include a hardwired electrical power system for a home or building, is connected to each of a plurality of devices. These devices may include a VCR/DVD or other media player (e.g., CD, etc.), a television, a monitor or any other display device capable of playing video and which plugs into the electrical power system. This list is not exhaustive and other devices are contemplated by the present invention.

FIG. 1 illustratively depicts a network with three devices. A device 14 includes a master device, and device 16 and 18 include slave devices (labeled slave 1 and slave 2, respectively). Each device 14, 16 and 18 includes a powerline modem 20. Each powerline modem is capable of communication on powerline network 12, which permits communication between devices 16 and 18 themselves and/or master device 14. Each of devices 16 and 18 includes a clock synchronization circuit 22, and master device 14 includes a clock synchronization circuit 24. Each powerline modem 20 includes a transmitter/receiver 26, which transmit and receive data on predetermined data subcarrier frequencies or data subcarriers 28.

Powerline modems 20 employ a multicarrier modulation format in which data is transmitted on several data subcarriers (28) simultaneously. Such a format gives modems 20 capabilities such as the ability to turn off subcarriers that are receiving interference. Instead of inserting a timestamp into the data stream itself, the present invention employs a completely separate subcarrier or synch carrier 30 (or group of subcarriers in case one is lost due to interference) to handle the timing synchronization of various devices on powerline network 12. Advantageously, since modems may use several subcarriers, an addition of or the dedicated use of an existing subcarrier(s) for synchronization may be easy to implement in present systems.

Clock synch circuit 24 generates synch carrier 30. Clock circuits 22 listen for the synch carrier 30 and use the signal to synchronize data received by receivers 26. A particularly useful feature of the present invention permits asynchronous devices to be able to display synchronized video. That is, since, for example, MPEG synchronization occurs on a synch subcarrier 30 that is separate from the data, devices (e.g., devices 16 and 18) can process the data at difference rates, while all of the devices listen to synch subcarrier 30 to derive timing information that will be used to play back the MPEG video. Other data formats contemplated include video, audio or other applications.

Figure 2:
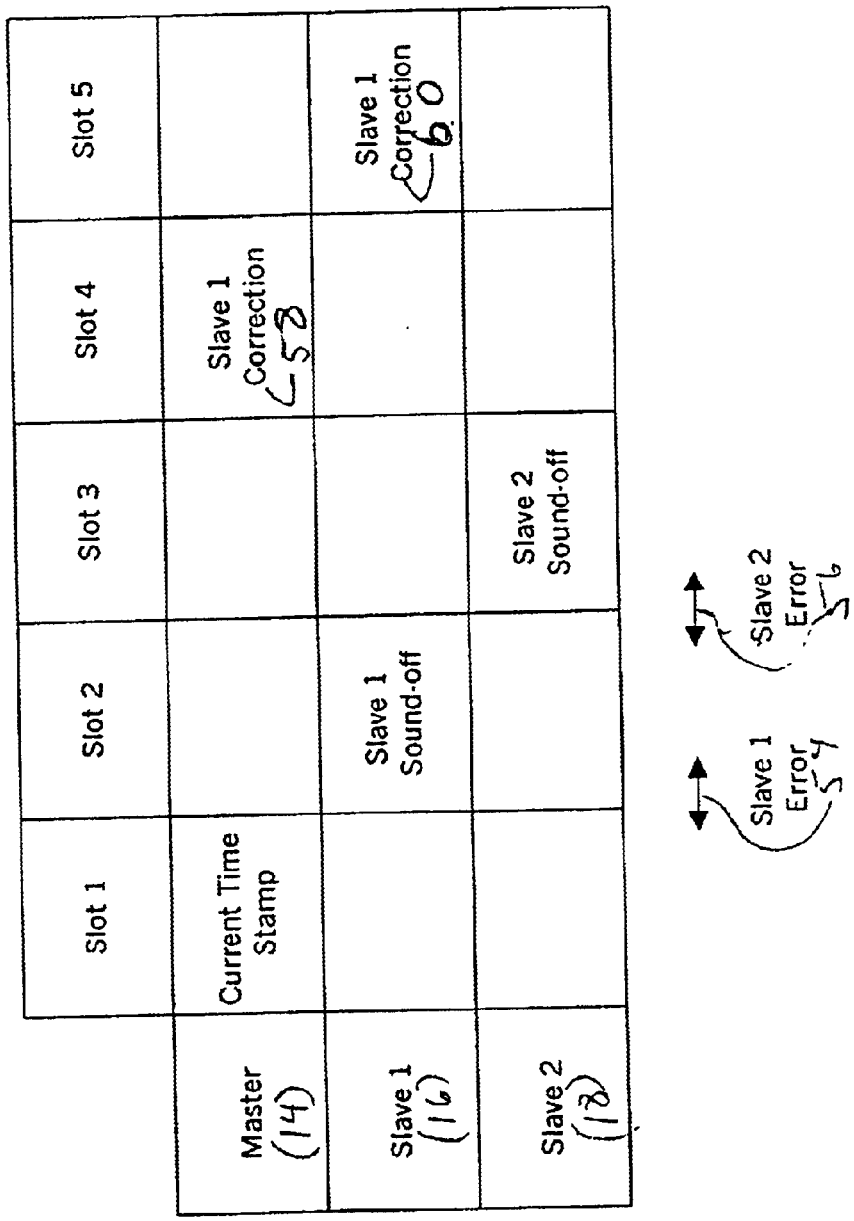
FIG. 2 is a diagram showing time slot allocation in accordance with an embodiment of the present invention.

Referring to FIG. 2 with continued reference to FIG. 1, one embodiment of the present invention uses a slotted time structure on synch subcarrier 30 only. FIG. 2 is a table showing time slots 1–5 for the master device 14 and slave 1 and slave 2 devices (16 and 18 respectively). This illustrative example is for a network with one master and two slave devices; however, a network with multiple slaves and even a hierarchical system of master devices is contemplated. Master (14) sends out a timestamp during one slot (slot 1) to provide a reference for slaves (16 and 18). Each slave then responds to the master during the slaves' assigned time slot. In this example, slave 1's time slot is slot 2 while slave 2's time slot is slot 3. Due to possible offsets in their clocks, slave 1 and slave 2 may be either early or late in sounding off. Errors in synchronization manifest themselves using this sound-off procedure. The error may be determined as an offset between the slave's time slot start point and the actual transmitted sound-off start point indicated as errors 54 and 56. Based on possible errors 54 and 56, the master then sends each of the slaves a correction factor 58 and 60 to adjust the clocks of slave 1 and slave 2. The correction factors 58 and 60 are sent during dedicated slots, e.g., slots 4 and 5. Devices having different standards, such as for example, different operating frequencies or different synchronization needs are permitted to derive a timing reference from synch subcarrier(s) 30. In addition, information on synch subcarrier 30 may be asynchronous with the information on data subcarriers 28. This permits both fast and slow devices to use a same timebase reference.

Each device in the system may have a clock resolution that maybe different from a synchronizing subcarrier frequency. While the synchronization subcarrier provides a certain resolution (preferably the highest resolution in the system), the devices themselves may have a mechanism to interpret this information to update their own clocks, which may have a different resolution. In one embodiment, this can be accomplished by dropping the lower order bits, which specify the resolution of the clock signal.

Many powerline modems use a multicarrier modulation format. One possible method is to use Orthogonal Frequency Division Multiplexing (OFDM), although other multicarrier modulation schemes can be used as well. Depending on the implementation, the subcarriers for such systems may be in the frequency ranges of between about 1 to about 30 MHz. The subcarriers may be spaced between each frequency interval, however, such an implementation is not required. Possible embodiments of the present invention add an additional subcarrier(s) at the next available frequency interval(s) for synchronization purposes, or alternately dedicate a plurality of data subcarriers for synchronization purposes.

Having described preferred embodiments for time synchronization for data over a powerline modem network (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of synchronization of a powerline network for a plurality of devices, comprising the steps of:

providing the plurality of devices each having a powerline modem and a clock circuit for synchronizing a data rate, the powerline modem permitting data transmission between the plurality of devices over the powerline network on data carriers;

transmitting a synchronization signal over the powerline network, the synchronization signal being a carrier operating at a frequency different from the data carriers, the synchronization signal providing each of the plurality of devices a time reference to synchronize the data rate; and each of the plurality of devices sounding off during an assigned time slot.

2. The method as recited in claim 1, wherein the step of transmitting a synchronization signal includes transmitting the synchronization signal over a plurality of carriers operating at a frequency different from a frequency of the data carriers.

3. The method as recited in claim 1, wherein the step of transmitting a synchronization signal includes the step of sending a current timestamp to the plurality of devices.

4. The method as recited in claim 1, further comprising the step of determining an error offset between the assigned time slot and the sounding off of each of the plurality of devices.

5. The method as recited in claim 1, further comprising the step of transmitting a correction factor to the plurality of devices to correct synchronization of the clock circuit of the devices, which include error offsets.

6. A powerline network with data synchronization, comprising:

a plurality of devices each having a powerline modem and a clock circuit for synchronizing a data rate, the powerline modem permitting data transmission between the plurality of devices over the powerline network on data carriers; and a master device having a powerline modem coupled to the plurality of devices and including a clock transmission circuit, the clock transmission circuit generates a synchronization signal over the plurality of devices, the synchronization signal being a carrier operating at a frequency different from the data carriers, the synchronization signal providing each of the plurality of devices a time reference to synchronize the data rate, and the synchronization signal including a current timestamp which causes each of the plurality of devices to sound off during an assigned time slot.

7. The network as recited in claim 6, wherein the synchronization signal includes a plurality of carriers operating at a frequency different from the data carriers.

8. The network as recited in claim 6, further comprising a correction factor sent to each of the plurality of devices by the master device to correct synchronization of the clock circuit of the plurality of devices, which include error offsets, the error offset being a difference between the assigned time slot and the sounding off of each of the plurality of devices.

* * * * *